United States Patent
Keith, Jr.

(10) Patent No.: US 7,624,086 B2
(45) Date of Patent: Nov. 24, 2009

(54) PRE-INSTALL COMPLIANCE SYSTEM

(75) Inventor: Robert O. Keith, Jr., Modesto, CA (US)

(73) Assignee: MAXSP Corporation, Sunnyvale, CA (US)

( * ) Notice: Subject to any disclaimer, the term of this patent is extended or adjusted under 35 U.S.C. 154(b) by 78 days.

(21) Appl. No.: 11/368,212

(22) Filed: Mar. 2, 2006

(65) Prior Publication Data

US 2006/0224544 A1     Oct. 5, 2006

Related U.S. Application Data

(60) Provisional application No. 60/658,970, filed on Mar. 4, 2005.

(51) Int. Cl.
*G06N 5/04* (2006.01)

(52) U.S. Cl. .............. 706/60; 706/10; 706/45; 706/50; 706/61; 717/174; 717/175; 717/176; 717/177; 717/178; 709/202; 709/203; 709/230

(58) Field of Classification Search .......... 706/10, 706/14, 45, 50, 60, 61; 717/100, 124, 126, 717/174–178; 709/202, 203, 220–226, 230
See application file for complete search history.

(56) References Cited

U.S. PATENT DOCUMENTS

| | | | | |
|---|---|---|---|---|
| 4,866,635 | A | 9/1989 | Kahn et al. .......... 364/513 |
| 5,602,990 | A | 2/1997 | Leete .......... 395/183.22 |
| 5,649,196 | A | 7/1997 | Woodhill et al. .......... 395/620 |
| 5,659,743 | A | 8/1997 | Adams et al. .......... 395/621 |
| 5,802,364 | A | 9/1998 | Senator et al. | |
| 5,812,751 | A | 9/1998 | Ekrot et al. | |
| 5,835,911 | A * | 11/1998 | Nakagawa et al. .......... 707/203 |
| 5,933,647 | A * | 8/1999 | Aronberg et al. .......... 717/178 |
| 5,950,010 | A | 9/1999 | Hesse et al. | |
| 5,974,547 | A | 10/1999 | Klimenko .......... 713/2 |
| 6,012,152 | A | 1/2000 | Douik et al. .......... 714/26 |
| 6,029,196 | A | 2/2000 | Lenz .......... 709/221 |
| 6,067,582 | A * | 5/2000 | Smith et al. .......... 710/5 |
| 6,170,065 | B1 | 1/2001 | Kobata et al. .......... 714/7 |
| 6,209,089 | B1 | 3/2001 | Selitrennikoff et al. .......... 713/2 |

(Continued)

OTHER PUBLICATIONS

IEEE100 The Authoritative Dictionary Of IEEE Standards Terms, Seventh Edition, Jan. 2003, 3 pages.
VMware, VMware Infrastructure Architecture Overview, Jun. 14, 2006, pp. 1-14.
VMware, Using VMware Infrastructure for Backup and Restore, Oct. 26, 2006, pp. 1-20.

*Primary Examiner*—David R Vincent
*Assistant Examiner*—Omar F Fernandez Rivas
(74) *Attorney, Agent, or Firm*—Haverstock & Owens LLP

(57) ABSTRACT

The present invention interrogates computer systems prior to software installations to ensure software installations operate correctly and do not conflict with existing hardware and software. An agent application is first installed on a user's system. When a new program is about to be installed on the user's system, the agent checks if certain prerequisite requirements are met. The prerequisite requirements are downloaded from an expert system library, and the agent interrogates the user's system to determine if it passes the downloaded requirements. If the system passes, then the software is installed. If the system does not pass, then a report is sent to the user and/or a remediation script is initiated to repair the problem. After software is installed, if errors arise that were not previously detected, a feedback mechanism sends the errors to the expert system library so future errors are detected preemptively.

65 Claims, 5 Drawing Sheets

U.S. PATENT DOCUMENTS

| | | | |
|---|---|---|---|
| 6,212,660 B1 | 4/2001 | Joeressen et al. | 714/758 |
| 6,282,711 B1 | 8/2001 | Halpern et al. | |
| 6,292,827 B1 | 9/2001 | Raz | 709/217 |
| 6,301,612 B1 | 10/2001 | Selitrennikoff et al. | 709/220 |
| 6,311,221 B1 | 10/2001 | Raz et al. | 709/231 |
| 6,317,761 B1 | 11/2001 | Landsman et al. | 707/513 |
| 6,349,137 B1 | 2/2002 | Hunt et al. | |
| 6,356,915 B1 | 3/2002 | Chtchetkine et al. | 707/200 |
| 6,363,400 B1 | 3/2002 | Chtchetkine et al. | 707/200 |
| 6,366,296 B1 | 4/2002 | Boreczky et al. | 345/719 |
| 6,378,035 B1 | 4/2002 | Parry et al. | 711/110 |
| 6,421,777 B1 | 7/2002 | Pierre-Louis et al. | 713/2 |
| 6,449,658 B1 | 9/2002 | Lafe et al. | 709/247 |
| 6,463,530 B1 | 10/2002 | Sposato | 713/2 |
| 6,473,794 B1 | 10/2002 | Guheen et al. | 709/223 |
| 6,477,531 B1 | 11/2002 | Sullivan et al. | 707/10 |
| 6,490,677 B1 | 12/2002 | Aquilar et al. | 713/1 |
| 6,536,037 B1 | 3/2003 | Guheen et al. | 717/151 |
| 6,556,950 B1 | 4/2003 | Schwenke et al. | 702/183 |
| 6,574,618 B2 | 6/2003 | Eylon et al. | 707/1 |
| 6,606,744 B1 | 8/2003 | Mikurak | 717/174 |
| 6,625,651 B1* | 9/2003 | Swartz et al. | 709/226 |
| 6,625,754 B1 | 9/2003 | Aguilar et al. | |
| 6,636,857 B2 | 10/2003 | Thomas et al. | 707/10 |
| 6,654,797 B1 | 11/2003 | Kamper | 709/220 |
| 6,694,375 B1 | 2/2004 | Beddus et al. | 709/249 |
| 6,697,852 B1 | 2/2004 | Ryu | |
| 6,718,464 B2 | 4/2004 | Cromer et al. | 713/2 |
| 6,728,530 B1 | 4/2004 | Heinonen et al. | |
| 6,735,625 B1* | 5/2004 | Ponna | 709/223 |
| 6,751,658 B1 | 6/2004 | Haun et al. | 709/222 |
| 6,757,894 B2 | 6/2004 | Eylon et al. | 717/177 |
| 6,816,462 B1 | 11/2004 | Booth, III et al. | 370/248 |
| 6,816,882 B1 | 11/2004 | Conner et al. | |
| 6,871,210 B1 | 3/2005 | Subramanian | 709/203 |
| 6,885,481 B1 | 4/2005 | Dawe | |
| 6,886,020 B1 | 4/2005 | Zahavi et al. | 707/204 |
| 6,915,343 B1 | 7/2005 | Brewer et al. | 709/224 |
| 6,954,930 B2* | 10/2005 | Drake et al. | 717/178 |
| 6,959,235 B1 | 10/2005 | Abdel-Malek et al. | |
| 7,003,560 B1* | 2/2006 | Mullen et al. | 709/223 |
| 7,003,663 B2 | 2/2006 | Lagosanto et al. | |
| 7,058,698 B2 | 6/2006 | Chatterjee et al. | |
| 7,080,118 B2 | 7/2006 | Hildebrand | |
| 7,143,307 B1 | 11/2006 | Witte et al. | |
| 7,149,698 B2 | 12/2006 | Guheen et al. | |
| 7,178,166 B1 | 2/2007 | Taylor et al. | |
| 7,210,143 B2* | 4/2007 | Or et al. | 717/174 |
| 7,237,122 B2* | 6/2007 | Kadam et al. | 713/191 |
| 7,287,053 B2 | 10/2007 | Bodin | |
| 7,401,125 B1 | 7/2008 | Uchida et al. | |
| 7,512,584 B2* | 3/2009 | Keith, Jr. | 706/60 |
| 2001/0034736 A1 | 10/2001 | Eylon et al. | 707/200 |
| 2001/0037323 A1 | 11/2001 | Moulton et al. | 707/1 |
| 2001/0037399 A1* | 11/2001 | Eylon et al. | 709/231 |
| 2001/0037400 A1 | 11/2001 | Raz et al. | 709/232 |
| 2001/0044850 A1 | 11/2001 | Raz et al. | 709/231 |
| 2001/0049793 A1 | 12/2001 | Sugimoto | 713/200 |
| 2002/0007418 A1 | 1/2002 | Hegde et al. | 709/231 |
| 2002/0013827 A1 | 1/2002 | Edstrom et al. | |
| 2002/0042833 A1 | 4/2002 | Hendler et al. | 709/231 |
| 2002/0049764 A1 | 4/2002 | Boothby et al. | 707/100 |
| 2002/0083183 A1 | 6/2002 | Pujare et al. | 709/231 |
| 2002/0087717 A1 | 7/2002 | Artzi et al. | 709/236 |
| 2002/0087883 A1 | 7/2002 | Wohlgemuth et al. | 713/201 |
| 2002/0087963 A1 | 7/2002 | Eylon et al. | 717/174 |
| 2002/0091763 A1 | 7/2002 | Shah et al. | 709/203 |
| 2002/0107920 A1 | 8/2002 | Hotti | |
| 2002/0116585 A1 | 8/2002 | Scherr | 711/133 |
| 2002/0124092 A1 | 9/2002 | Urien | 709/229 |
| 2002/0129089 A1 | 9/2002 | Hegde et al. | 709/200 |
| 2002/0138640 A1 | 9/2002 | Raz et al. | 709/231 |
| 2002/0157089 A1 | 10/2002 | Patel et al. | 717/178 |
| 2002/0161868 A1 | 10/2002 | Paul et al. | 709/221 |
| 2002/0161908 A1 | 10/2002 | Benitez et al. | 709/231 |
| 2002/0169797 A1 | 11/2002 | Hegde et al. | 707/500.1 |
| 2002/0188941 A1 | 12/2002 | Cicciarelli et al. | |
| 2003/0004882 A1 | 1/2003 | Holler et al. | 705/51 |
| 2003/0005096 A1 | 1/2003 | Paul et al. | 709/222 |
| 2003/0009538 A1 | 1/2003 | Shah et al. | 709/219 |
| 2003/0033379 A1 | 2/2003 | Civanlar et al. | 709/218 |
| 2003/0037328 A1 | 2/2003 | Cicciarelli et al. | |
| 2003/0041136 A1 | 2/2003 | Cheline et al. | 709/223 |
| 2003/0046371 A1 | 3/2003 | Falkner | |
| 2003/0051128 A1 | 3/2003 | Rodriguez et al. | 713/100 |
| 2003/0110188 A1 | 6/2003 | Howard et al. | 707/200 |
| 2003/0126242 A1 | 7/2003 | Chang | 709/222 |
| 2003/0140160 A1 | 7/2003 | Raz et al. | 709/231 |
| 2003/0191730 A1 | 10/2003 | Adkins et al. | |
| 2003/0233383 A1 | 12/2003 | Koskimies | |
| 2004/0010716 A1* | 1/2004 | Childress et al. | 713/201 |
| 2004/0093492 A1 | 5/2004 | Daude et al. | 713/156 |
| 2004/0104927 A1* | 6/2004 | Husain et al. | 345/733 |
| 2004/0123153 A1 | 6/2004 | Wright et al. | 713/201 |
| 2004/0128346 A1 | 7/2004 | Melamed et al. | 709/203 |
| 2004/0148306 A1 | 7/2004 | Moulton et al. | 707/101 |
| 2004/0201604 A1 | 10/2004 | Kraenzel et al. | 345/700 |
| 2004/0236843 A1 | 11/2004 | Wing et al. | 709/219 |
| 2005/0027846 A1* | 2/2005 | Wolfe et al. | 709/223 |
| 2005/0033808 A1 | 2/2005 | Cheng et al. | |
| 2005/0044197 A1 | 2/2005 | Lai | |
| 2005/0044544 A1* | 2/2005 | Slivka et al. | 717/174 |
| 2005/0108593 A1 | 5/2005 | Purushothaman et al. | |
| 2005/0144218 A1 | 6/2005 | Heintz | 709/202 |
| 2005/0149729 A1 | 7/2005 | Zimmer et al. | 713/168 |
| 2005/0160289 A1 | 7/2005 | Shay | |
| 2005/0193245 A1 | 9/2005 | Hayden et al. | |
| 2005/0216524 A1 | 9/2005 | Gomes et al. | |
| 2005/0256952 A1 | 11/2005 | Mouhanna et al. | |
| 2005/0262503 A1* | 11/2005 | Kane | 717/176 |
| 2005/0273486 A1 | 12/2005 | Keith, Jr. | 709/200 |
| 2005/0283606 A1 | 12/2005 | Williams | 713/166 |
| 2006/0021040 A1 | 1/2006 | Boulanger et al. | 726/23 |
| 2006/0031407 A1 | 2/2006 | Dispensa et al. | |
| 2006/0031529 A1 | 2/2006 | Keith, Jr. | 709/227 |
| 2006/0047716 A1 | 3/2006 | Keith, Jr. | 707/203 |
| 2006/0047946 A1 | 3/2006 | Keith, Jr. | 713/2 |
| 2006/0074943 A1 | 4/2006 | Nakano et al. | |
| 2006/0095705 A1 | 5/2006 | Wichelman et al. | 711/171 |
| 2006/0143709 A1 | 6/2006 | Brooks et al. | 726/23 |
| 2006/0179061 A1 | 8/2006 | D'Souza et al. | |
| 2006/0224545 A1 | 10/2006 | Keith, Jr. | 706/60 |
| 2007/0143374 A1 | 6/2007 | D'Souza et al. | |
| 2007/0174658 A1 | 7/2007 | Takamoto et al. | |
| 2007/0174690 A1 | 7/2007 | Kambara et al. | |
| 2007/0233633 A1 | 10/2007 | Keith, Jr. | 706/60 |
| 2007/0239905 A1 | 10/2007 | Banerjee et al. | 710/22 |
| 2007/0271290 A1 | 11/2007 | Keith, Jr. | 707/101 |
| 2007/0271428 A1 | 11/2007 | Alturi | |
| 2007/0274315 A1 | 11/2007 | Keith | 370/392 |
| 2007/0276836 A1 | 11/2007 | Chatterjee et al. | |
| 2008/0034071 A1 | 2/2008 | Wilkinson et al. | |
| 2008/0077622 A1 | 3/2008 | Keith | 707/200 |
| 2008/0077630 A1 | 3/2008 | Keith | 707/204 |
| 2008/0127294 A1 | 5/2008 | Keith | 726/1 |
| 2008/0209142 A1 | 8/2008 | Obernuefemann | |

* cited by examiner

| 300 ↗ ID | Class | Platform | Product | Description | Criteria 313 ⌐ Test_ref 312 | Remediation Description | Remediation Script |
|---|---|---|---|---|---|---|---|
| 302 | 304 | 306 | 308 | 310 | 312 | 314 | 316 |

Fig. 3

```
<diag>
   <id>5</id>
   <version>1.0</version>
   <date_created>1.0</date_created>
   <date_modified>1.0</date_modified>
   <maxsp_url></maxsp_url>
   <order>3</order>
   <name>Ethernet card errors</name>
   <category>hardware</category>
   <family>Hardware Management</family>
   <repairable>no</repairable>
   <desc_language>English</desc_language>
   <desc>Your ethernet card is reporting errors. This may be due to faulty
         network card, cable or other hardware.
   <remediation>1. First, replace your ethernet cable or re-seat the
         cables.  2.  You may need to replace the ethernet card.
   </remediation>
   <script_lang>max1</script_lang>
   <diag_script>
         let ethers = F$GETWMI('ethport1', 'counters')
         If (ethers > 0) then
               F$TMPSTOR('ethernet counters', ethers)
               Return 8
         endif
   </diag_script>
   <repair_script></repair_script>
   <platforms>Windows</platforms>
   <dependency></dependency>
   <confidence><confidence>
   <health_index></health_index>
</diag>
```

Fig. 4

PRE-INSTALL COMPLIANCE SYSTEM

RELATED APPLICATION(S)

This patent application claims priority under 35 U.S.C. §119(e) of the co-pending, co-owned U.S. Provisional Patent Application, Ser. No. 60/658,970, filed Mar. 4, 2005, and entitled "PRE-INSTALL COMPLIANCE AND CENTRAL PROBLEM DISCOVERY SYSTEM." The Provisional Patent Application, Ser. No. 60/658,970, filed Mar. 4, 2005, and entitled "PRE-INSTALL COMPLIANCE AND CENTRAL PROBLEM DISCOVERY SYSTEM" is also hereby incorporated by reference in its entirety.

The following co-owned, co-filed, U.S. patent application, Ser. No. 11/368,214 (now U.S. Pat. No. 7,512,584) filed on Mar. 2, 2006 and entitled COMPUTER HARDWARE AND SOFTWARE DIAGNOSTIC AND REPORT SYSTEM is also incorporated by reference.

FIELD OF THE INVENTION

The present invention relates to the field of software installation. More specifically, the present invention relates to the field of ensuring software is installed correctly without conflicting with existing hardware or software.

BACKGROUND OF THE INVENTION

With the complexity and interoperability of software and hardware today, it is very difficult to install one program without having an effect on one or more pre-existing programs. Microsoft® Windows® operating systems have a plethora of components that all must maintain their integrity, otherwise the operating system becomes unstable and possibly fails. Furthermore, generally when hardware is installed, software drivers which allow the hardware to communicate with the software, must be installed as well. If these drivers are corrupted, the hardware will not function properly. Additionally, many software programs have components beyond a main executable file which allow the programs to communicate with the operating system, and if these components are deleted or modified incorrectly, the program will no longer function. All of these components, whether they be part of the operating system, hardware or other software, must be able to co-exist without harming each other. Specifically, when the system is modified in some way such as by installing a new piece of hardware or a software program, the system must do it so that everything still functions correctly.

According to research, almost 30% of application failures are related to installation and configuration errors. There are a number of products available to aid in installation of software onto a user's computer such as InstallShield, made by InstallShield Software Corp. Programs such as InstallShield create a single executable installation file. With InstallShield, a software developer uses templates and pre-built interface objects that enable easy packaging of the software such that the installation files and software files can be accessed and invoked from a single executable installation file. Thus, users who install software packaged with InstallShield are able to install the program quickly with hopes of not affecting other applications or system characteristics. The user obtains the file and invokes it to begin the software installation. The installation files are automatically decompressed to a temporary directory, and a setup file is invoked. Once the software has been installed, the temporary directory is erased. Problems may arise if the user disrupts the software program during installation. Furthermore, InstallShield does not necessarily adequately check to ensure the new program will perfectly run without harming the system. InstallShield attempts to avoid installation failures by helping developers create setups that install correctly. The problem is that software installations are still often problematic. Software installations fail due to the existing software and hardware environment. Software installations often test for dependent hardware and software, but these tests are many times inadequate. Missing hardware drivers and back revisions of dependent software cause software installations to fail or become unstable after installation is complete. Software installations often conflict with existing software packages. Furthermore, software installations overlay common library modules into common shared directories. Software installations which behave incorrectly break existing software packages or sometimes make the entire computer system unstable.

Some software installation systems create software packages and include a wizard to help the user through installations and pre-check the computing environment for software prerequisites as described above. However, these software installation systems have many deficiencies. The tests are not comprehensive and often do not perform any hardware tests. Existing packages do not work well in conjunction with software deployment systems. These existing packages also lack an ability to grow with new problems discovered by users. Furthermore, existing systems are not service provider friendly. Hence, a solution is needed to overcome these issues.

SUMMARY OF THE INVENTION

The present invention interrogates computer systems prior to software installations to ensure software installations operate correctly and do not conflict with existing hardware and software. An agent application is first installed on a user's system. When a new program is about to be installed on the user's system, the agent, independent of a software installer, checks if certain prerequisite requirements are met. The prerequisite requirements are downloaded from an expert system library, and the agent interrogates the user's system to determine if it passes the downloaded requirements. If the system passes, then the software is installed. If the system does not pass, then a report is sent to the user and/or a remediation script is initiated to repair the problem. After software is installed, if errors arise that were not previously detected, a feedback mechanism sends the errors to the expert system library so future errors are detected preemptively.

In one aspect, a system for assisting correct installation of an application comprises an expert system library for storing information including system data and an agent coupled to the expert system library for using the information stored in the expert system library to check for and resolve conflicts of installation of the application. The system further comprises a feedback mechanism for sending feedback to the expert system library. The feedback is data related to a conflict. The system data relates to one or more software packages, hardware devices and operating systems. The system data further relates to one or more conflicts between the software packages, hardware devices or operating systems. The expert system library receives input from multiple sources. The system is implemented on an application service provider infrastructure. Business enterprise applications are implemented on the system. The system functions offline. The system is scaleable to support large application service provider bases. The system is implemented on disparate network topologies. The system further comprises a license/subscription scheme. The expert system library is stored on one or more servers. The one or more servers are selected from the group consisting of entry-level servers, mid-range servers, enterprise servers, personal computers, Apple computers, thin clients, laptops, cell phones and PDAs. The agent is stored on one or more computing devices. The computing devices are selected from the group consisting of personal computers, Apple computers, thin clients, laptops, cell phones and PDAs. The agent functions on an operating system selected from the group consisting of Microsoft® Windows®, Microsoft® CE, Unix, Linux, handheld operating systems and cell phone operating systems. The system is implemented on a network. The expert system library and the agent are not on the same computing device or server.

In another aspect, a system for assisting correct installation of an application comprises one or more servers, one or more computing devices coupled to the one or more servers for computing data, an expert system library contained within the one or more servers for storing information including system data, an agent contained within the one or more computing devices for using the information stored in the expert system library to check for and resolve conflicts of installation of the application and a feedback mechanism contained within the one or more computing devices for sending feedback to the expert system library. The feedback is data related to a conflict. The system data relates to one or more software packages, hardware devices and operating systems. The system data further relates to one or more conflicts between the software packages, hardware devices or operating systems. The expert system library receives input from multiple sources. The system is implemented on an application service provider infrastructure. Business enterprise applications are implemented on the system. The system functions offline. The system is scaleable to support large application service provider bases. The system is implemented on disparate network topologies. The system further comprises a license/subscription scheme. The computing devices are selected from the group consisting of personal computers, Apple computers, thin clients, laptops, cell phones and PDAs. The one or more servers are selected from the group consisting of entry-level servers, mid-range servers, enterprise servers, personal computers, Apple computers, thin clients, laptops, cell phones and PDAs. The agent functions on an operating system selected from the group consisting of Microsoft® Windows®, Microsoft® CE, Unix, Linux, handheld operating systems and cell phone operating systems. The system is implemented on a network. The expert system library and the agent are not on the same computing device or server.

In yet another aspect, a method of assisting correct installation of an application comprises detecting initiation of installation of the application, downloading one or more prerequisite modules to a computing device from an expert system library, interrogating the computing device for prerequisite requirements based on the one or more prerequisite modules and determining if the computing device passes the one or more prerequisite requirements. The method further comprises allowing the installation of the application if the computing device passes the one or more prerequisite requirements. The method further comprises reporting one or more problems to a user if the computing device does not pass the one or more prerequisite requirements. The method further comprises initiating one or more remediation scripts if the computing device does not pass the one or more prerequisite requirements. The method further comprises sending feedback to the expert system library. The expert system library receives input from multiple sources. The method is implemented on an application service provider infrastructure. Business enterprise applications are implemented on the computing device. The method functions offline. The method is scaleable to support large application service provider bases. The method is implemented on disparate network topologies. The method further comprises implementing a license/subscription scheme. The expert system library is contained on one or more servers. The one or more servers are selected from the group consisting of entry-level servers, mid-range servers, enterprise servers, personal computers, Apple computers, thin clients, laptops, cell phones and PDAs. The computing device is selected from the group consisting of a personal computer, an Apple computer, a thin client, a laptop, a cell phone and a PDA. The method is implemented on a network.

In another aspect, a network of devices for assisting correct installation of an application comprises one or more servers, one or more computing devices coupled to the one or more servers for computing data, an expert system library contained within the one or more servers for storing information including system data, an agent contained within the one or more computing devices for using the information stored in the expert system library to check for and resolve conflicts of installation of the application and a feedback mechanism contained within the one or more computing devices for sending feedback to the expert system library. The feedback is data related to a conflict. The system data relates to one or more software packages, hardware devices and operating systems. The system data further relates to one or more conflicts between the software packages, hardware devices or operating systems. The expert system library receives input from multiple sources. The network of devices is implemented on an application service provider infrastructure. Business enterprise applications are implemented on the network of devices. The network of devices functions offline. The network of devices is scaleable to support large application service provider bases. The network of devices is implemented on disparate network topologies. The network of devices further comprises a license/subscription scheme. The one or more computing devices are selected from the group consisting of personal computers, Apple computers, thin clients, laptops, cell phones and PDAs. The one or more servers are selected from the group consisting of personal computers, Apple computers, thin clients, laptops, cell phones and PDAs. The agent functions on an operating system selected from the group consisting of Microsoft® Windows®, Microsoft® CE, Unix, Linux, handheld operating systems and cell phone operating systems. The expert system library and the agent are not on the same computing device or server.

BRIEF DESCRIPTION OF THE DRAWINGS

FIG. 3 illustrates an example data structure for the expert system library.

FIG. 4 illustrates an example XML coded version of the data structure for the expert system library.

DETAILED DESCRIPTION OF THE PREFERRED EMBODIMENT

Figure 1:
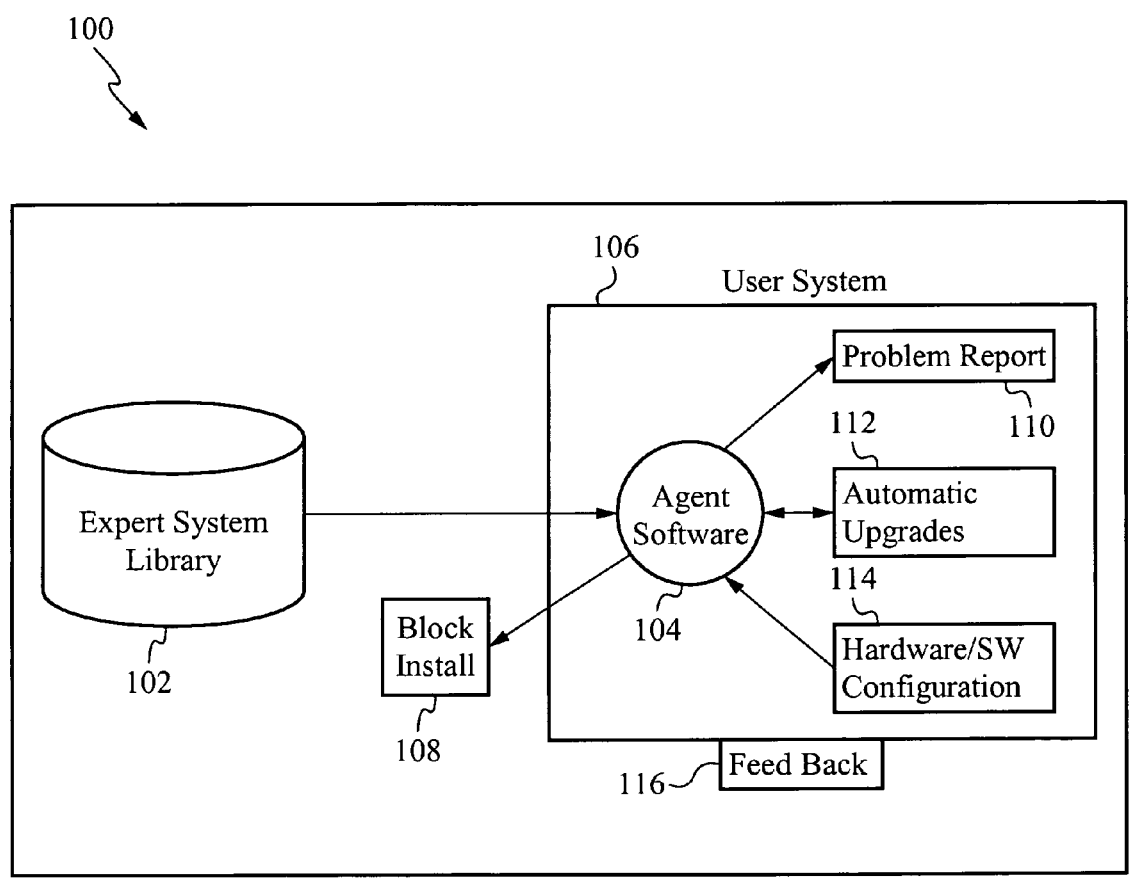
FIG. 1 illustrates a block diagram representation of the main components of the preferred embodiment of the present invention.

The present invention is a system for interrogating computer systems prior to installations and independent of a software installer to ensure new software installations operate correctly and do not conflict with existing hardware and software. The present invention works in conjunction with automated software deployment and installation systems. The present invention interrogates the existing system to ensure that all dependent environmental issues are met, and in some cases either upgrades the environment with dependent modules or blocks installations. In some embodiments, the present invention knows of incompatible software packages and/or hardware environments and prevents software installations which would fail or become unstable.

The present invention provides the ability to build a central expert system library repository with constructive input from multiple sources. The system is also able to support an application service provider (ASP) infrastructure and business enterprise applications. Furthermore, software applications have the ability to run disconnected from the central server and network. The system is scaleable so that it has the ability to support extremely large ASP user bases over disparate network topologies. The system supports subscription licenses, so that when the subscription is void or expired, the desktop software will be disabled and inactive. The system also supports disparate end-user hardware including Personal Computers (PCs), Apple PCs, thin clients, laptops, cell phones, PDAs and other mobile devices.

The present invention generally comprises three main components: a central compatibility expert system library, a host resident client interrogation agent and a user support feedback mechanism.

The expert system library is located centrally, typically with automated software deployment systems. The expert system library contains information about each software package and the hardware and software prerequisites required to adequately support the package. Information stored includes shared software module names and revisions, hardware driver prerequisites, hardware requirements, operating system revision levels and other operating environment prerequisites. The expert system library also contains software and hardware exceptions. Software packages often conflict with one another and the present invention contains knowledge of these incompatibilities to block and warn of problematic installations.

Agent software installed on an end user's system is resident and thereby able to interrogate the user's system for hardware and software configurations. The information obtained by the interrogation is used in conjunction with the expert system library information to ascertain whether end user systems contain the prerequisite hardware and software. The expert system library describes individual prerequisites such as software versions, registry values and hardware and software configurations which are required or problematic. The agent application then uses the information to interrogate the client system for the existence of these prerequisite conditions.

The present invention when used by a larger support organization is able to be an extremely valuable system to end users. Each time a customer reports a problem and the support organization corrects the problem within the software deployment, the correction procedure or script is added to the central expert system library. The feedback mechanism will continuously expand the expert system library and ensure each new software installation is tested for a wider and more comprehensive group of problems and has solutions to revolve such problems. Once the expert system library has stored every possible prerequisite problem, all customers of the support organization are able to potentially have all new installations error free.

FIG. 1 illustrates a block diagram representation of the main components of the preferred embodiment of the present invention 100. In the preferred embodiment of the present invention, an expert system library 102 stores information about software packages and hardware and software configurations 114 required to support the software packages. An agent application 104 is located on one or more user systems 106. The agent application 104 interrogates the user system 106 for hardware and software configurations. Using the information obtained from the interrogations, the agent application 104 is able to determine if certain prerequisites are met. If they are, then the installation is allowed to proceed. However, if the prerequisites are not met, then the agent application 104 blocks the installation 108. After blocking the installation, the user system 106 sends a problem report 110 to the end-user. The user system 106 also initiates a remediation script to repair the problem if possible. Furthermore, the agent application 104 is able to receive automatic upgrades 112 so that it is able to continue protecting against improper installations. If after installation, there is a conflict between programs or hardware, a user feedback mechanism 116 sends the conflict information to the expert system library 102, so that the expert system library 102 is able to incorporate such a conflict and will be able to detect, prevent and resolve it in the future. The expert system library 102 is able to continuously grow so that it is able to detect more and more issues as time passes. All of the components of the preferred embodiment of the present invention function to assist in preventing installations that will potentially corrupt the user system 106 by detecting those known problems and then growing the expert system library 102 when new issues are discovered, so that they will be prevented in the future.

Figure 2:
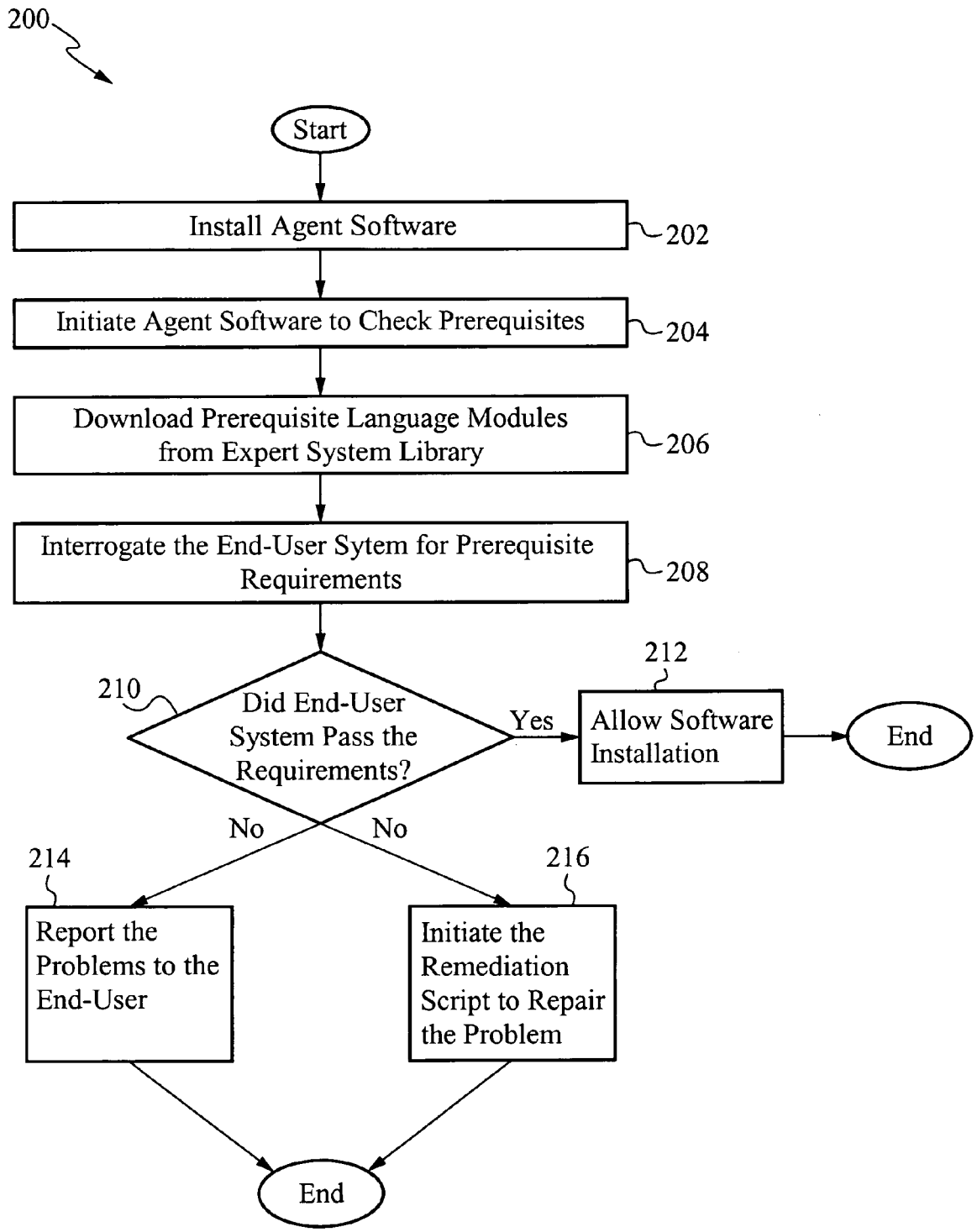
FIG. 2 illustrates a flowchart of the agent software determining whether software meets the requirements to be installed.

FIG. 2 illustrates a flowchart of the agent application determining whether new software meets the requirements to be installed 200. At the step 202, the agent application is installed on the end-user's system. The agent application is able to come pre-installed on a user's system or a user is able to download the agent application as needed. At the step 204, software deployment initiates the agent application to check prerequisites. When a new software is about to be installed, the agent application is alerted that it needs to prepare to verify the new software. At the step 206, the agent application downloads prerequisite language modules from the central expert system library. In a preferred embodiment, the agent application has a base set of prerequisite language modules locally stored and updates to the expert system library are downloaded to the agent application as they are developed, which saves time and bandwidth. In an alternative embodiment, the agent application is lean and only downloads the prerequisite language modules needed each time a new software application is installed. At the step 208, the agent application interrogates the end-user system for prerequisite requirements. At the step 210, the agent application determines if the end-user system passes the requirements. At the step 212, if the end-user system passes the requirements, then the software installation is allowed. If the end-user system does not pass the requirements, then the agent application either reports the problems to the end-user at the step 214 and/or initiates the remediation script to repair the problem at the step 216.

There are a wide range of problem conditions detected that will cause the end-user system not to pass the requirements in the step 210. The following are examples of prerequisite conditions tested by the agent application; however, they are not meant to limit the invention in any way. Software is tested for problems such as problematic software patch revisions, incompatible software packages, problematic software installations and problematic software package un/de-installations. The operating system is also checked for problems, such as Windows® registry corruption and existing performance issues. Environmental issues are investigated such as low disk space or hardware errors. Network issues are checked such as interface errors, DNS or IP configuration problems, IP routing failure and ISP network performance. Other important elements of a secure system are investigated such as detecting viruses, driver problems and serious security vulnerabilities. Any issues that could prevent a successful installation of new software are also able to be investigated to ensure a stable system after a new installation.

FIG. 3 illustrates an example data structure for the expert system library. The prerequisite expert system library transfers data structures to the agent so that the client is able to perform checks when there is a new software installation. The preferred format for the data structures is XML, although any format is acceptable. The example data structure 300 has the following item definitions within it. An ID item 302 stores the test record number. A class item 304 holds the type of test to be performed, such as performance, software patch level, security, virus or software inconsistency. A platform item 306 stores the operating system environment information, for example Windows NT, ME or XP. A product item 308 contains the affected application's information. The product item 308 is a specific component that needs to be investigated such as the Windows Shell or a specified application. A description item 310 stores a detailed description of the problem described. A criteria item 312 holds the subroutine used to identify test criteria. Within the criteria item 312, a test_ref subroutine 313 is used to identify test criteria. Although only one test_ref subroutine 313 is shown in FIG. 3, the criteria item 312 is able to hold a number of test_ref subroutines 313 depending on what test criteria is needed. A remediation description item 314 contains instructions on how to repair the problem described, and a remediation script item 316 stores a script to automatically remediate the problem described.

FIG. 4 illustrates an example XML coded version of a data structure of the expert system library. In the example, the ID item is "5." The platform item is "Windows." Furthermore, the category is "hardware" and the family is "Hardware Management." Hence, the agent application knows that it needs to investigate issues concerning hardware management of Windows®. Additional items are able to be included in the data structure as well such as a dependency, confidence and health index. The date_created and date_modified items are useful in determining when the data structure was created or modified which helps in the process of problem solving. The description item describes the problem, which in this example, is that the "ethernet card is reporting errors." Diagnostic script language is included to determine the status of the hardware or software. Remediation information is used to help resolve the problem, such as a suggestion to "replace your ethernet cable." If proper, a remediation script is included to automatically correct the problem. As described above, in the example, the data structure comprises the items required to perform system checks to aid in determining potential conflicts on a user's system. The aforementioned example is not meant to limit the present invention in any way.

The agent application is host-based software, pre-installed on an end user system. The software is an interpreter for the data structure downloaded from the central expert system library and a library of functions. The functions primarily access information about a user's system or remediate a user's system. For example, one function is able to query an operating system to determine if it has a certain patch installed, and another function is able to install the patch. The agent application is also responsible for reporting problems found. Other functions of the agent application include, but are not limited to, accessing hardware error counts, reading/writing the Windows® registry, accessing software modules and version/patch levels, moving, copying and removing files from the file system, reading operating system environment such as memory and disk space, updating virtual memory configurations and many other functions to maintain a stable environment.

The expert system library utilizes a plug-in architecture. Each expert system library record has functionality of a discrete program such that each entry is able to be added to the expert system library without affecting the other expert system library entries and updated or removed from the expert system library with no effect on the other problem records. Such a plug-in architecture allows multiple authors to maintain different problem records independently of simultaneous work being done on other problem records.

The expert system library data structure includes procedural language elements including, but not limited to, boolean logic, string manipulation, flow control verbs and simple match functions. The language is used to create powerful and flexible mechanisms to test for the existence of problem conditions. For example the following language function tests the Windows® registry for the existence of a value:

```
str regvalue
str regkey
regkey =
"\HKEY_LOCAL_MACHINE\SOFTWARE\Microsoft\
WindowsNT\CurrentVersion\Hotfix\Q312895"
regvalue = F$GETREG(regkey)
if (regvalue != "<error>") then
   return 9 //signal hotfix not installed
else
   return 0 //signal hotfix installed
endif
```

The example language checks if the value of the Windows® registry value at Q312895 is an error. If the value is not an error, then the Microsoft® patch is installed. Further, the routine is able to check for one or more code modules which are supposed to be updated by this patch. If the code module version is less than the correct value, then the registry has the patch recorded as installed, but the actual code module could be below the correct value, which would mean the patch was installed but the installation failed.

The language interpreter, part of the agent application, contains a set of functions which are called the Expert System Library Data Language. The functions are specific to operating environments, but operate the same for the Expert System Library Data Language. The operating environments where the functions reside could include Microsoft® Windows®, Microsoft® CE, Unix, Linux, handheld operating systems, cell phone operating systems and many others. The function portability allows the present invention to be implemented across many different platforms.

Since the functions are created in the specific operating system environment, the functions are able to reach into the operating system environments to retrieve specific and detailed data. Examples of such functions include, but are not limited to: Read Windows Registry Value, Check Device Error Counter Values, Check File System Organizations and Structures, Check File Modules and File Version Values, Check for Installation of Specific Applications, Read Environmental Values and Counters, Read Windows Event Log Entries as well as other functions to retrieve specific data.

Figure 5:
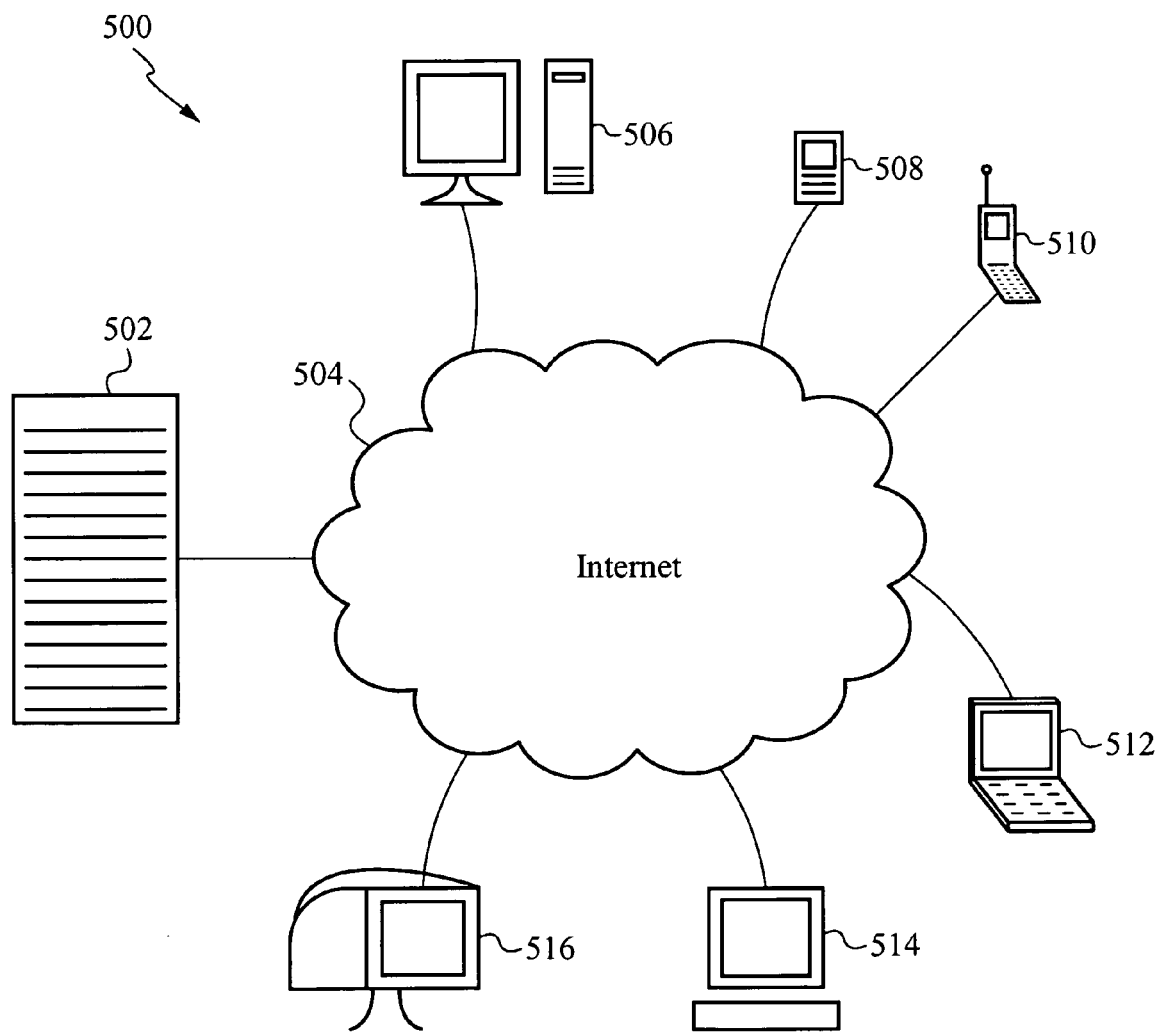
FIG. 5 illustrates a network implementing the preferred embodiment of the present invention.

FIG. 5 illustrates a network implementing the preferred embodiment of the present invention. The present invention is implemented over a network of devices 500. The expert system library is stored on a server 502 that is coupled to the Internet 504 in a preferred embodiment. In alternative embodiments, the server 502 is coupled to a company intranet or other types of networks such as a Local Area Network (LAN), Wide Area Network (WAN) or a Metropolitan Area Network (MAN). Furthermore, the coupling between the server 502 and the Internet 504 is able to be via networking cables or wireless means. The Internet 504 is also coupled to a variety of computing devices that have the agent application stored on them. The computing devices include, but are not limited to, a personal computer 506, a PDA 508, a cell phone 510, a laptop computer 512, a thin client 514 or an Apple personal computer 516. When users of the computing devices are about to install a new program or new hardware, the agent application performs its pre-installation checks to ensure that the new program or hardware will not conflict with any of the preexisting setup. Furthermore, after installation of the new program or hardware, if there are any conflicts that went undetected, then the reporting mechanism will send feedback to the server 502, so that the expert system library is able to learn of the issue and in the future is able to prevent such a conflict from occurring. Thus, users of the system are able to safely install new programs and hardware and when there are undiscovered issues, with a large network of people, these undiscovered issues will be discovered and then prevented so that other users do not have the same problem.

The present invention supports subscription licenses, so that when the subscription is void or expired, the desktop software will be disabled and inactive. With respect to subscriptions, the present invention has interfaces for billing support.

An additional feature of the present invention includes offline operation. The software has the ability to run disconnected form the central server and network. The drawback with offline operation is that a user must install some if not all of the expert system library, so that it is able to be utilized locally. Furthermore, if an issue arises, the feedback mechanism is not able to communicate with the expert system library, thus the expert system library will be limited in its growth capabilities. Special preparations must be taken for proper offline functionality to ensure that required licenses and subscriptions are abided by.

To utilize the present invention, in the preferred embodiment, an end user computer has the agent application pre-installed. In an alternative embodiment, a user has to install the agent application after either downloading it or via CD. Once the agent application exists on the user's computer, it retrieves prerequisites from an expert system library. The prerequisites are used to determine if new installations are acceptable or not. The agent application monitors for any new installations, whether they be hardware or software. If the agent application determines that the new installation will not conflict with the current system, then it permits the installation to proceed. However, if the new installation will cause a conflict, then a script will attempt to remediate the problem. Furthermore, a notification is sent to the user describing the issue. If a new installation is accepted and then later causes a conflict, a feedback mechanism sends a notification to the expert system library that a problem was discovered. In the preferred embodiment the feedback is automatically sent via software. In an alternative embodiment, the feedback is sent via a user reporting the problem. The feedback is then utilized by the expert system library to increase the total knowledge. Then when another user with a similar or the same setup attempts the new installation, the agent application will recognize the issue and will take the appropriate actions to handle it. In time, the number of conflicts caused by new installations should gradually decrease as the expert system library grows and is prepared for many different potential conflicts.

In operation, the present invention assists users in installing new software and hardware such that it is able to recognize potential conflicts that a typical user is unaware of. Other programs attempt to install software correctly, but they are insufficient. The present invention not only checks for software conflicts, it checks for conflicts within the operating system and it checks for hardware conflicts as well. When a conflict does arise, the present invention utilizes scripts to attempt to resolve the problem and further reports these conflicts to the user. Furthermore, the agent application which monitors a user's computer is coupled to a feedback mechanism which is able to send data to the expert system library so that the expert system library is able to learn and expand to handle new potential conflicts. Since the expert system library is continuously expanding with new knowledge, once a new problem is discovered, the agent application is able to aid future users to avoid the problem. Ultimately, the present invention could potentially continue to gain knowledge to the point where most, if not all, conflicts have been discovered and will be prevented before they occur.

Within the present application, software includes programs, applications, scripts, system software, middleware in addition to any other generally known meaning of software.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A system for assisting correct installation of an application comprising:
   a. an expert system library for storing information including computing system data; and
   b. an agent coupled to the expert system library for using the information stored in the expert system library to check for and resolve software, hardware and operating system conflicts of installation of the application by interrogating a computing device for prerequisite requirements, determining if the computing device passes the prerequisite requirements and installing the application if the computing device passes the prerequisite requirements and if the computing device does not pass the prerequisite requirements performing one of initiating a remediation script to remediate the conflicts and aborting the installation of the application;

wherein the information stored in the expert system library includes one or more prerequisite modules that are downloaded by the agent as soon they are added to the expert system library.

2. The system as claimed in claim 1 further comprising a feedback mechanism for sending feedback to the expert system library.

3. The system as claimed in claim 2 wherein the feedback is data related to a conflict and is sent to expand the expert system library.

4. The system as claimed in claim 1 wherein the computing system data relates to one or more software packages, hardware devices and operating systems.

5. The system as claimed in claim 4 wherein the computing system data further relates to one or more conflicts between the software packages, hardware devices or operating systems.

6. The system as claimed in claim 1 wherein the expert system library receives input from multiple sources.

7. The system as claimed in claim 1 wherein the system is implemented on an application service provider infrastructure.

8. The system as claimed in claim 1 wherein business enterprise applications are implemented on the computing device.

9. The system as claimed in claim 1 wherein the system functions offline.

10. The system as claimed in claim 1 wherein the system is scaleable to support large application service provider bases.

11. The system as claimed in claim 1 wherein the system is implemented on disparate network topologies.

12. The system as claimed in claim 1 further comprising a license/subscription scheme.

13. The system as claimed in claim 1 wherein the expert system library is stored on one or more servers.

14. The system as claimed in claim 13 wherein the one or more servers are selected from the group consisting of entry-level servers, mid-range servers, enterprise servers, personal computers, Apple computers, thin clients, laptops, cell phones and PDAs.

15. The system as claimed in claim 1 wherein the agent is stored on one or more computing devices.

16. The system as claimed in claim 15 wherein the computing devices are selected from the group consisting of personal computers, Apple computers, thin clients, laptops, cell phones and PDAs.

17. The system as claimed in claim 1 wherein the agent functions on an operating system selected from the group consisting of Microsoft® Windows®, Microsoft® CE, Unix, Linux, handheld operating systems and cell phone operating systems.

18. The system as claimed in claim 1 wherein the system is implemented on a network.

19. The system as claimed in claim 1 wherein the expert system library and the agent are not on the same computing device or server.

20. A system for assisting correct installation of an application comprising:
   a. one or more servers;
   b. one or more computing devices coupled to the one or more servers for computing data;
   c. an expert system library contained within the one or more servers for storing information including computing system data;
   d. an agent contained within the one or more computing devices for using the information stored in the expert system library to check for and resolve software, hardware and operating system conflicts of installation of the application by interrogating the one or more computing devices for prerequisite requirements, determining if the one or more computing devices pass the prerequisite requirements and installing the application if the one or more computing devices pass the prerequisite requirements and if the one or more computing devices do not pass the prerequisite requirements performing one of initiating a remediation script to remediate the conflicts and aborting the installation of the application; and
   e. a feedback mechanism contained within the one or more computing devices for sending feedback information related to unanticipated conflicts that occur after the installation to the expert system library to expand the expert system library.

21. The system as claimed in claim 20 wherein the computing system data relates to one or more software packages, hardware devices and operating systems.

22. The system as claimed in claim 21 wherein the computing system data further relates to one or more conflicts between the software packages, hardware devices or operating systems.

23. The system as claimed in claim 20 wherein the expert system library receives input from multiple sources.

24. The system as claimed in claim 20 wherein the system is implemented on an application service provider infrastructure.

25. The system as claimed in claim 20 wherein business enterprise applications are implemented on a computing device.

26. The system as claimed in claim 20 wherein the system functions offline.

27. The system as claimed in claim 20 wherein the system is scaleable to support large application service provider bases.

28. The system as claimed in claim 20 wherein the system is implemented on disparate network topologies.

29. The system as claimed in claim 20 further comprising a license/subscription scheme.

30. The system as claimed in claim 20 wherein the one or more computing devices are selected from the group consisting of personal computers, Apple computers, thin clients, laptops, cell phones and PDAs.

31. The system as claimed in claim 20 wherein the one or more servers are selected from the group consisting of entry-level servers, mid-range servers, enterprise servers, personal computers, Apple computers, thin clients, laptops, cell phones and PDAs.

32. The system as claimed in claim 20 wherein the agent functions on an operating system selected from the group consisting of Microsoft® Windows®, Microsoft® CE, Unix, Linux, handheld operating systems and cell phone operating systems.

33. The system as claimed in claim 20 wherein the system is implemented on a network.

34. The system as claimed in claim 20 wherein the expert system library and the agent are not on the same computing device or server.

35. A method of assisting correct installation of an application comprising:
   a. detecting initiation of installation of the application;
   b. downloading one or more prerequisite modules to a computing device from an expert system library as soon as they are added to the expert system library;
   c. interrogating the computing device for prerequisite requirements based on the one or more prerequisite modules;
   d. determining if the computing device passes the one or more prerequisite requirements, wherein the prerequisite requirements are related to software, hardware and operating system information;
   e. allowing the installation of the application if the computing device passes the prerequisite requirements; and f. performing one of initiating a remediation script to remediate a conflict and aborting the installation of the application, if the computing device does not pass the prerequisite requirements.

36. The method as claimed in claim 35 further comprising reporting one or more problems to a user if the computing device does not pass the prerequisite requirements.

37. The method as claimed in claim 35 further comprising sending feedback to the expert system library to expand the expert system library.

38. The method as claimed in claim 35 wherein the expert system library receives input from multiple sources.

39. The method as claimed in claim 35 wherein the method is implemented on an application service provider infrastructure.

40. The method as claimed in claim 35 wherein business enterprise applications are implemented on the computing device.

41. The method as claimed in claim 35 wherein the method functions offline.

42. The method as claimed in claim 35 wherein the method is scaleable to support large application service provider bases.

43. The method as claimed in claim 35 wherein the method is implemented on disparate network topologies.

44. The method as claimed in claim 35 further comprising implementing a license/subscription scheme.

45. The method as claimed in claim 35 wherein the expert system library is contained on one or more servers.

46. The method as claimed in claim 45 wherein the one or more servers are selected from the group consisting of entry-level servers, mid-range servers, enterprise servers, personal computers, Apple computers, thin clients, laptops, cell phones and PDAs.

47. The method as claimed in claim 35 wherein the computing device is selected from the group consisting of a personal computer, an Apple computer, a thin client, a laptop, a cell phone and a PDA.

48. The method as claimed in claim 35 wherein the method is implemented on a network.

49. A network of devices for assisting correct installation of an application comprising:
   a. one or more servers;
   b. one or more computing devices coupled to the one or more servers for computing data;
   c. an expert system library contained within the one or more servers for storing information including computing system data;
   d. an agent contained within the one or more computing devices for using the information stored in the expert system library to check for and resolve software, hardware and operating system conflicts of installation of the application by interrogating the one or more computing devices for prerequisite requirements, determining if the one or more computing devices pass the prerequisite requirements and installing the application if the one or more computing devices pass the prerequisite requirements and if the one or more computing devices do not pass the prerequisite requirements performing one of initiating a remediation script to remediate the conflicts and aborting the installation of the application; and
   e. a feedback mechanism contained within the one or more computing devices for sending feedback information related to unanticipated conflicts that occur after the installation to the expert system library.

50. The network of devices as claimed in claim 49 wherein the feedback expands the expert system library.

51. The network of devices as claimed in claim 49 wherein the computing system data relates to one or more software packages, hardware devices and operating systems.

52. The network of devices as claimed in claim 51 wherein the computing system data further relates to one or more conflicts between the software packages, hardware devices or operating systems.

53. The network of devices as claimed in claim 49 wherein the expert system library receives input from multiple sources.

54. The network of devices as claimed in claim 49 wherein the network of devices is implemented on an application service provider infrastructure.

55. The network of devices as claimed in claim 49 wherein business enterprise applications are implemented on the network of devices.

56. The network of devices as claimed in claim 49 wherein the network of devices functions offline.

57. The network of devices as claimed in claim 49 wherein the network of devices is scaleable to support large application service provider bases.

58. The network of devices as claimed in claim 49 wherein the network of devices is implemented on disparate network topologies.

59. The network of devices as claimed in claim 49 further comprising a license/subscription scheme.

60. The network of devices as claimed in claim 49 wherein the one or more computing devices are selected from the group consisting of personal computers, Apple computers, thin clients, laptops, cell phones and PDAs.

61. The network of devices as claimed in claim 49 wherein the one or more servers are selected from the group consisting of personal computers, Apple computers, thin clients, laptops, cell phones and PDAs.

62. The network of devices as claimed in claim 49 wherein the agent functions on an operating system selected from the group consisting of Microsoft® Windows®, Microsoft® CE, Unix, Linux, handheld operating systems and cell phone operating systems.

63. The network of devices as claimed in claim 49 wherein the expert system library and the agent are not on the same computing device or server.

64. A system for assisting correct installation of an application comprising:
   a. an expert system library for storing information including computing system data;
   b. an agent coupled to the expert system library for using the information stored in the expert system library to check for and resolve software, hardware and operating system conflicts of installation of the application by interrogating a computing device for prerequisite requirements, determining if the computing device passes the prerequisite requirements and installing the application if the computing device passes the prerequisite requirements and if the computing device does not pass the prerequisite requirements performing one of initiating a remediation script to remediate the conflicts and aborting the installation of the application; and
   c. a feedback mechanism for sending feedback to the expert system library, wherein the feedback is data related to an unanticipated conflict and is sent to expand the expert system library such that the expert system library is able to detect, prevent and resolve the unanticipated conflict in the future and further wherein the expert system library receives input from multiple sources.

65. A method of assisting correct installation of an application comprising:
   a. detecting initiation of installation of the application;
   b. downloading one or more prerequisite modules to a computing device from an expert system library;
   c. interrogating the computing device for prerequisite requirements based on the one or more prerequisite modules;
   d. determining if the computing device passes the one or more prerequisite requirements, wherein the prerequisite requirements are related to software, hardware and operating system information;
   e. allowing the installation of the application if the computing device passes the prerequisite requirements;
   f. performing one of initiating a remediation script to remediate a conflict and aborting the installation of the application, if the computing device does not pass the prerequisite requirements; and
   g. sending feedback to the expert system library, wherein the feedback is data related to an unanticipated conflict and is sent to expand the expert system library such that the expert system library is able to detect, prevent and resolve the unanticipated conflict in the future and further wherein the expert system library receives input from multiple sources.

\* \* \* \* \*